United States Patent
Cho et al.

(10) Patent No.: US 12,381,282 B2
(45) Date of Patent: Aug. 5, 2025

(54) BATTERY PACK INCLUDING HOLD-DOWN BRACKET HAVING PROTRUSION STRUCTURE FORMED THEREON

(71) Applicant: LG ENERGY SOLUTION, LTD., Seoul (KR)

(72) Inventors: Hyun Young Cho, Daejeon (KR); Tae Hwan Roh, Daejeon (KR); Yoon Hee Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 674 days.

(21) Appl. No.: 17/637,727

(22) PCT Filed: Sep. 2, 2020

(86) PCT No.: PCT/KR2020/011781
§ 371 (c)(1),
(2) Date: Feb. 23, 2022

(87) PCT Pub. No.: WO2021/060734
PCT Pub. Date: Apr. 1, 2021

(65) Prior Publication Data
US 2022/0285780 A1 Sep. 8, 2022

(30) Foreign Application Priority Data
Sep. 23, 2019 (KR) .................. 10-2019-0116903

(51) Int. Cl.
*H01M 50/264* (2021.01)
*H01M 50/238* (2021.01)
*H01M 50/249* (2021.01)

(52) U.S. Cl.
CPC ....... *H01M 50/264* (2021.01); *H01M 50/238* (2021.01); *H01M 50/249* (2021.01); *H01M 2220/20* (2013.01)

(58) Field of Classification Search
CPC ............ H01M 50/264; H01M 50/249; H01M 50/238; H01M 2220/20
(Continued)

(56) References Cited

U.S. PATENT DOCUMENTS

2009/0325049 A1  12/2009  Niedzwiecki et al.
2017/0047563 A1*  2/2017  Lee ................... H01M 50/517
(Continued)

FOREIGN PATENT DOCUMENTS

CN  105098112 A  11/2015
CN  107112461 A   8/2017
(Continued)

OTHER PUBLICATIONS

International Search Report for PCT/KR2020/011781 mailed on Dec. 4, 2020.
(Continued)

*Primary Examiner* — Allison Bourke
*Assistant Examiner* — Robert Gene West
(74) *Attorney, Agent, or Firm* — Birch, Stewart, Kolasch & Birch, LLP

(57) ABSTRACT

Disclosed is a battery pack including a battery module assembly including two or more battery modules, each of the battery modules having one or more battery cells arranged adjacent to each other in the state of being mounted in cartridges, a base plate allowing the battery module assembly to be loaded thereon, and a hold-down bracket fixing the battery module assembly to the base plate, wherein each of the cartridges includes a step portion having a lower part protruding outwards, the hold-down bracket includes an upper end portion covering upper surfaces of the step portions of the cartridges, a lower end portion coupled to the base plate, and a middle portion connecting the upper end portion and the lower end portion to each other, and a (Continued)

protrusion structure protruding in a direction toward the base plate is formed on the lower end portion.

13 Claims, 7 Drawing Sheets

(58) Field of Classification Search
USPC .......................................................... 429/156
See application file for complete search history.

(56) References Cited

U.S. PATENT DOCUMENTS

| | | |
|---|---|---|
| 2017/0084892 A1 | 3/2017 | Lee et al. |
| 2017/0174160 A1 | 6/2017 | Uraguchi et al. |
| 2017/0200925 A1 | 7/2017 | Seo et al. |
| 2017/0309869 A1 | 10/2017 | Kim et al. |
| 2018/0269441 A1 | 9/2018 | Yum et al. |
| 2019/0312319 A1 | 10/2019 | Choi et al. |

FOREIGN PATENT DOCUMENTS

| | | |
|---|---|---|
| CN | 208336324 U | 1/2019 |
| CN | 110024211 A | 7/2019 |
| EP | 3 116 048 A1 | 1/2017 |
| EP | 3 200 256 A1 | 8/2017 |
| EP | 2 527 206 A1 | 4/2025 |
| JP | 6-188000 A | 7/1994 |
| JP | 11-297290 A | 10/1999 |
| JP | 2002-225570 A | 8/2002 |
| JP | 2006-50829 A | 2/2006 |
| JP | 2012-84239 A | 4/2012 |
| JP | 5618747 B2 | 11/2014 |
| JP | 2017-114221 A | 6/2017 |
| JP | 2017-515266 A | 6/2017 |
| JP | 2017-516263 A | 6/2017 |
| JP | 2019-156282 A | 9/2019 |
| KR | 200336867 Y1 * | 12/2003 |
| KR | 10-1045855 B1 | 7/2011 |
| KR | 10-2015-0127357 A | 11/2015 |
| KR | 10-2017-0063097 A | 6/2017 |
| KR | 101769577 B1 * | 8/2017 |

OTHER PUBLICATIONS

Extended European Search Report for European Application No. 20869562.7, dated Jul. 13, 2022.
Indian Office Action for Indian Application No. 202217006857, dated Jul. 10, 2023, with English translation.

* cited by examiner

[FIG. 1]
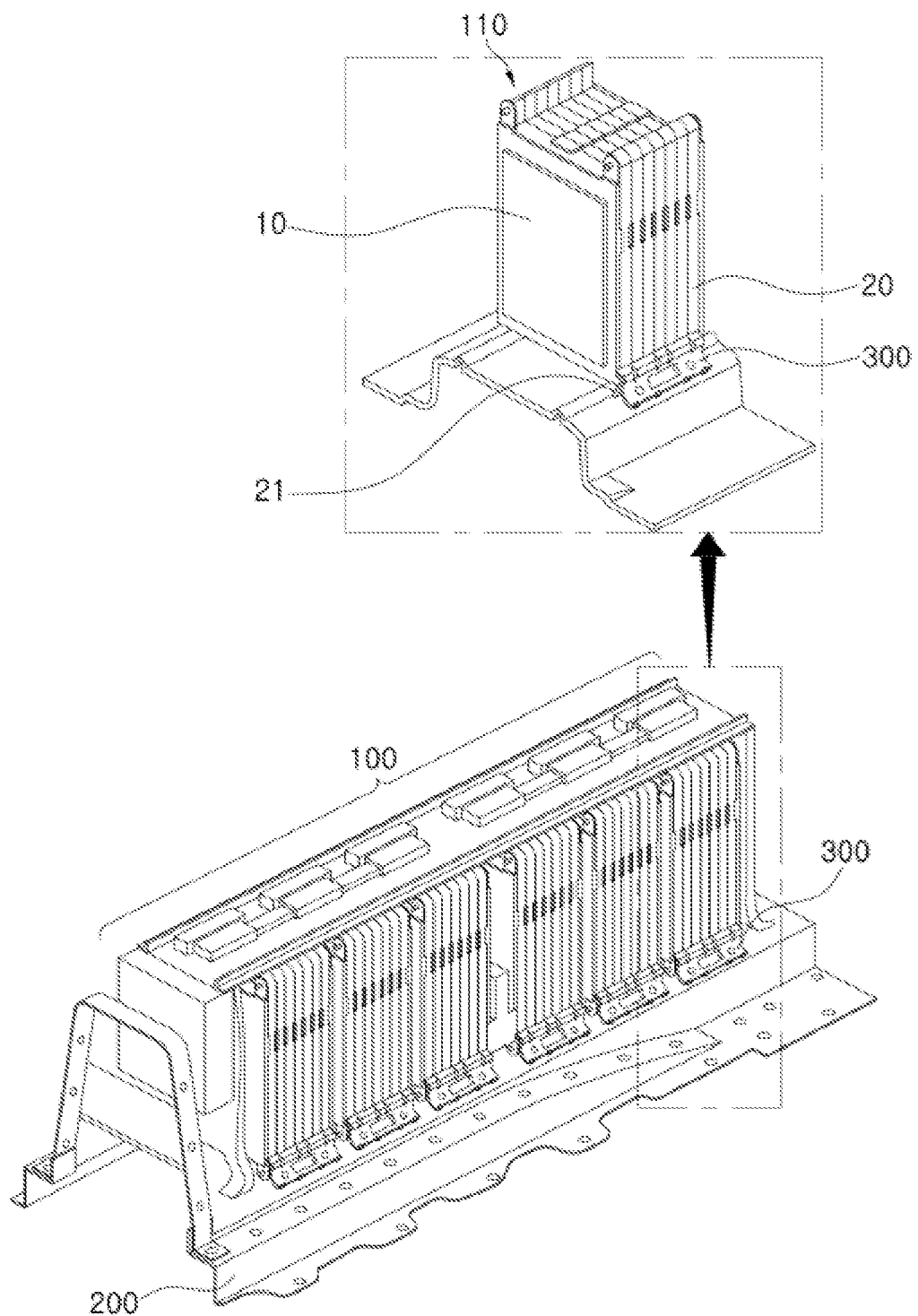

[FIG. 2]
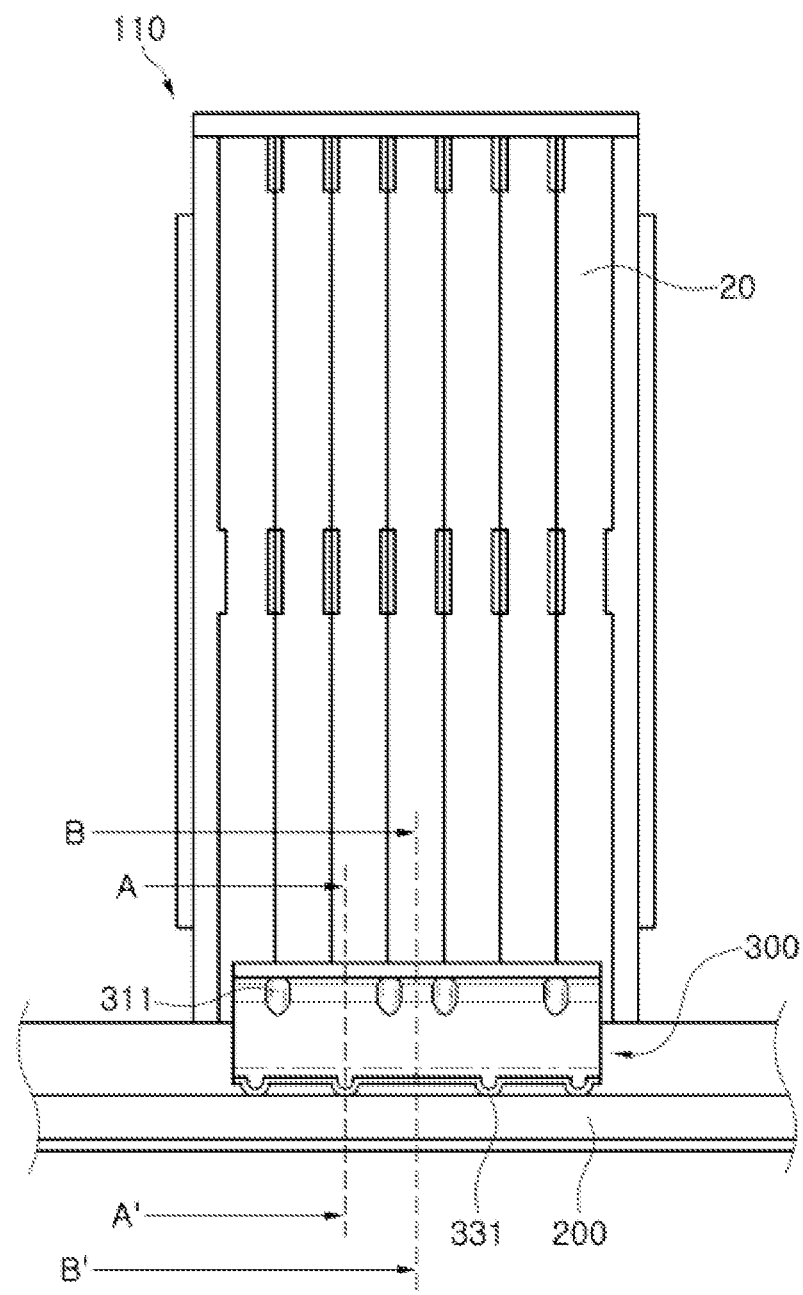

【FIG. 3】
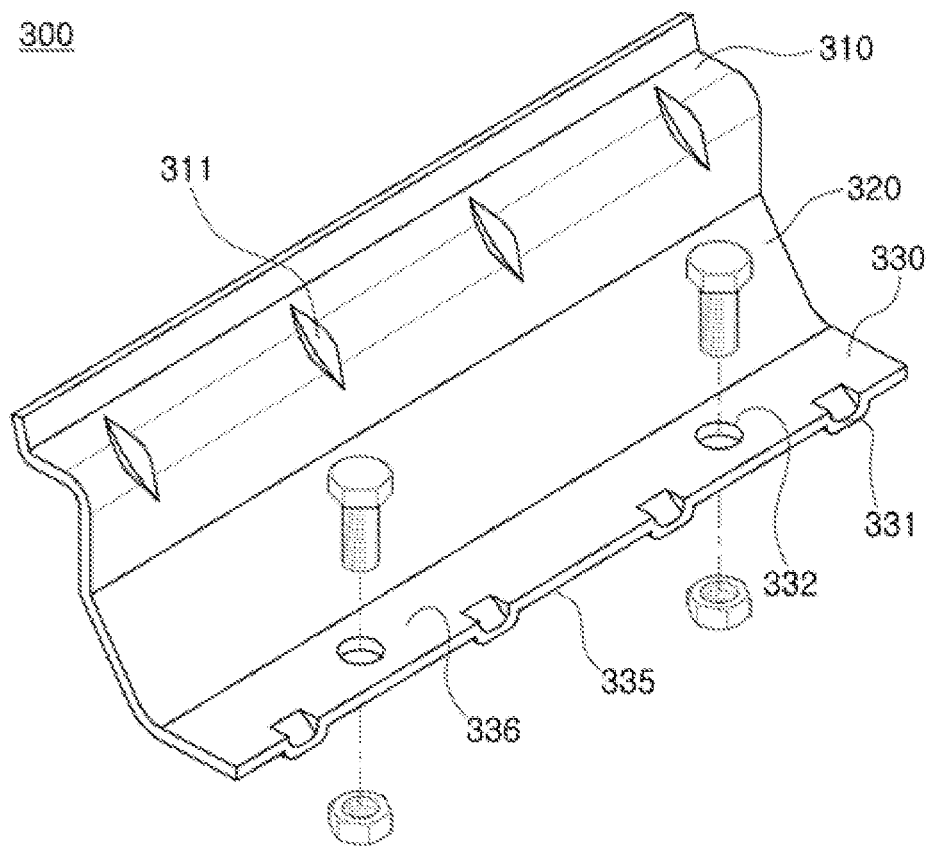
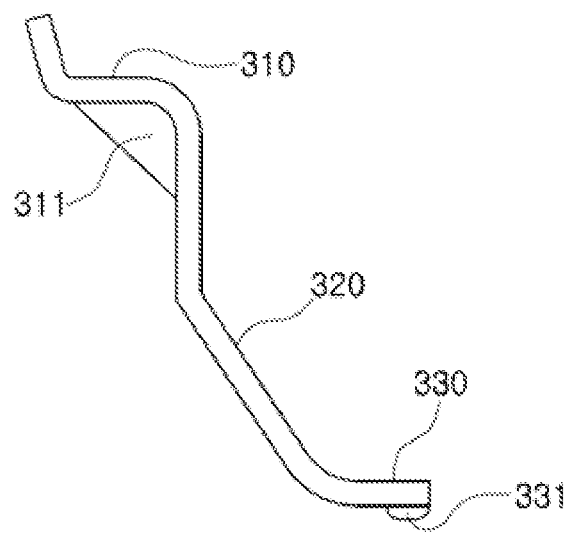

[FIG. 4]
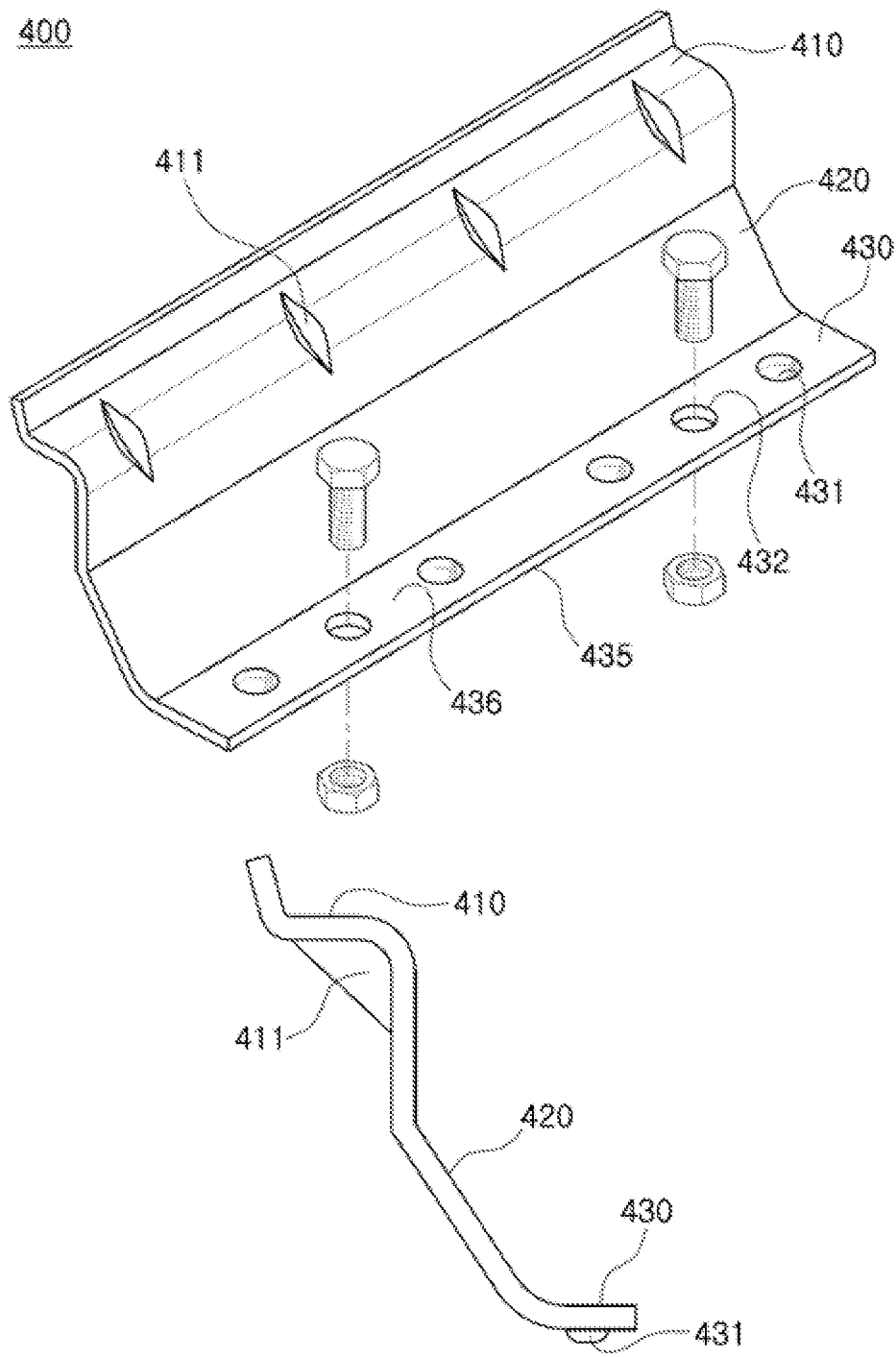

[FIG. 5]
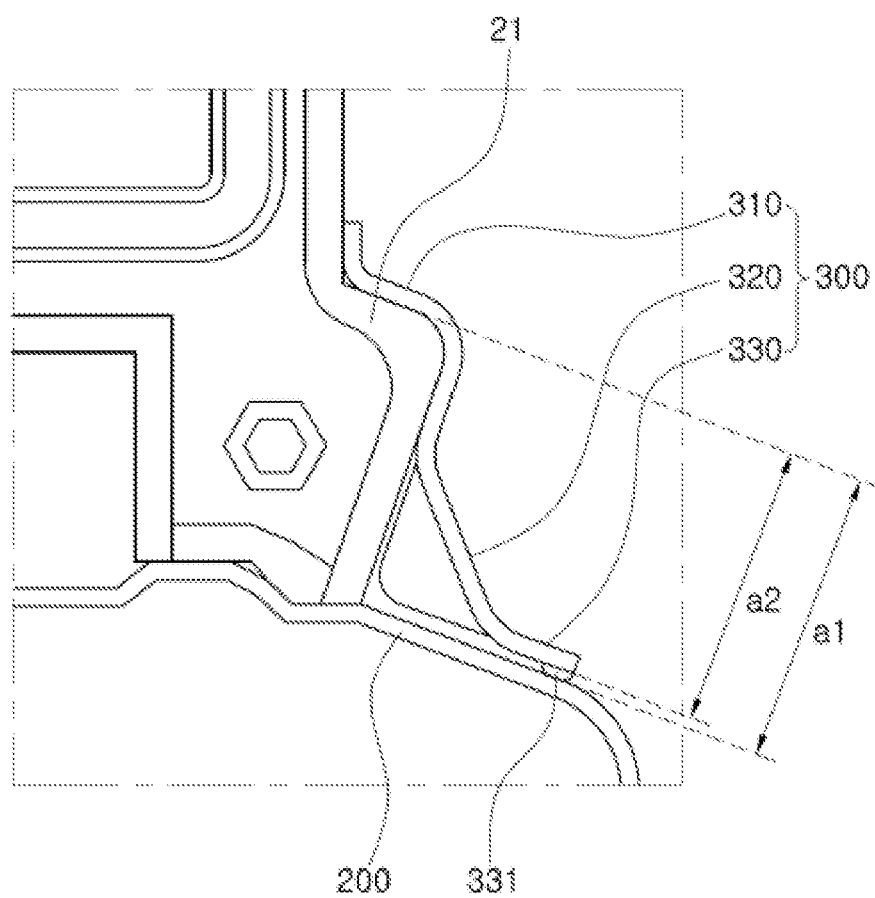

【FIG. 6】
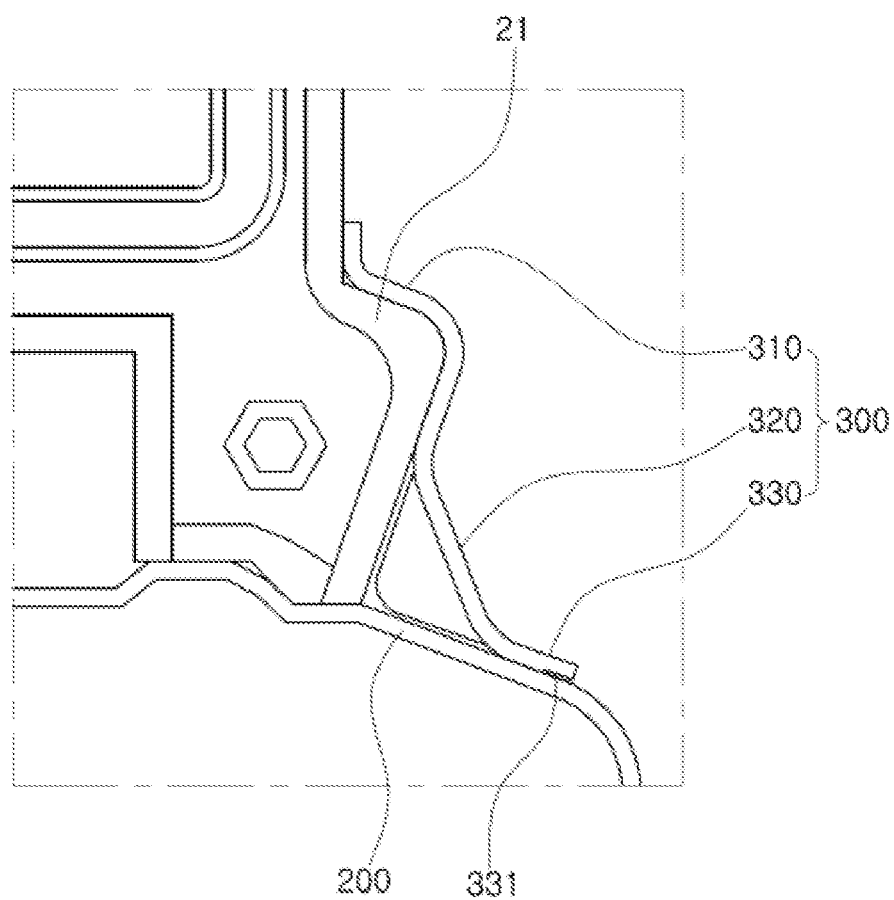

[FIG. 7]
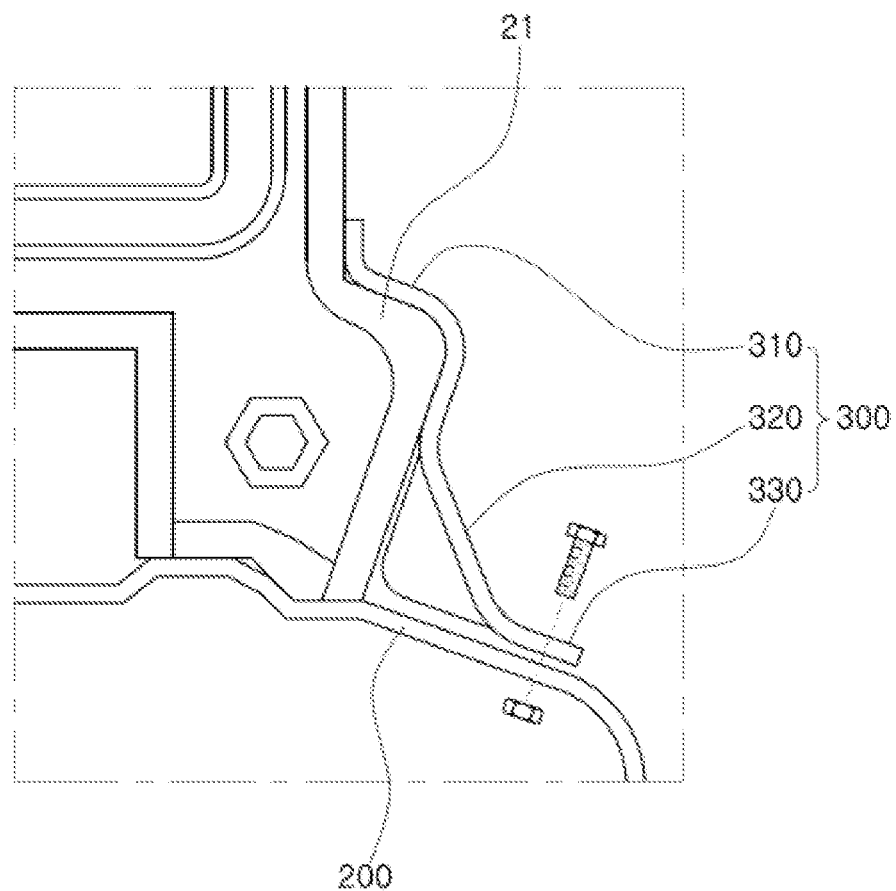

BATTERY PACK INCLUDING HOLD-DOWN BRACKET HAVING PROTRUSION STRUCTURE FORMED THEREON

TECHNICAL FIELD

This application claims the benefit of priority to Korean Patent Application No. 2019-0116903 filed on Sep. 23, 2019, the disclosure of which is hereby incorporated by reference herein its entirety.

The present invention relates to a battery pack including a hold-down bracket having a protrusion structure formed thereon, and more particularly to a battery pack configured to have a structure in which, when a battery module assembly is coupled to a base plate, the hold-down bracket is pressed by the height of the protrusion structure, whereby the battery module assembly is more stably coupled to the base plate.

BACKGROUND ART

As exhaust gas from vehicles using fuels, such as gasoline and diesel, is considered to be a cause of fine dust and air pollution, a secondary battery has attracted considerable attention as an alternative fuel.

With such a trend, an electric vehicle and a hybrid electric vehicle, which uses both a battery and a conventional combustion engine, have been developed and commercialized.

Conventionally, a nickel-metal hydride secondary battery was used as a power source of the electric vehicle. In recent years, however, a lithium ion secondary battery, which is characterized by high output and high capacity, has been used as a major power source of the electric vehicle.

In particular, the electric vehicle requires a high-output, large-capacity power source. In the case of a lithium secondary battery, unit battery cells may be connected to each other in series or in parallel to form a battery module, and a plurality of battery modules is connected to each other to manufacture a battery pack having desired output and capacity characteristics.

In order to fix the battery pack to a device, such as an electric vehicle, a battery module assembly may be fixed to a base plate, and then the base plate may be fixed to the device. At this time, a hold-down bracket may be used. In the case in which the hold-down bracket is used, a problem occurs in that bolting portions are loosened by vibration and impact that occur during running of the device. In the case in which a plurality of battery modules is individually fixed, a problem occurs in that tolerance occurs due to height difference between the battery modules, whereby force of fixing the battery modules is not uniformly applied.

In connection therewith, Patent Document 1 discloses a battery pack including a battery module assembly including battery modules, each of which is provided at a lower end portion of one side or each side thereof with an outward protrusion, a base plate on which the battery module assembly is loaded, and a hold-down bracket configured to have a structure in which one side region of the hold-down bracket wraps the outward protrusions of the battery modules and the other side region of the hold-down bracket is coupled to the base plate in order to fix each battery module of the battery module assembly to the base plate in position. However, there is a problem in that strong coupling between the battery module assembly and the base plate is not achieved, although stable fixing between the battery module assembly and the hold-down bracket is achieved.

Patent Document 2 discloses a fixing structure of a battery stack, which is loaded in a vehicle, to a lower frame, wherein the fixing structure includes a fixing frame configured to fix flange portions, disposed on the lower frame, which has a hollow sectional shape, so as to be opposite each other, to the lower frame so as to be commonly pushed from above, and the fixing frame is fixed to the hollow portion of the lower frame using bolts in the state in which the opposite flange portions are pushed by pushing members formed at opposite sides of the fixing frame.

In Patent Document 2, however, it is difficult to stably fix a cell holder including battery cells in an upward-downward direction, since fixing members are fastened to perform fixing in the state in which the flange portions of the cell holder are pushed simply by the pushing members.

Therefore, there is a high necessity for a battery pack having a structure in which, in the case in which a hold-down bracket is used in order to couple a battery module assembly to a base plate, coupling between the hold-down bracket and the battery module assembly is stably achieved and the force of coupling between the hold-down bracket and the base plate is increased.

PRIOR ART DOCUMENTS (Patent Document 1) Korean Registered Patent Publication No. 1769577 (2017 Aug. 11)

(Patent Document 2) Japanese Registered Patent Publication No. 5618747 (2014 Sep. 26)

DISCLOSURE

Technical Problem

The present invention has been made in view of the above problems, and it is an object of the present invention to provide a battery pack configured such that a protrusion structure is formed on a hold-down bracket configured to fix a battery module assembly to a base plate so as to protrude in a direction toward the base plate, whereby the force of coupling between the hold-down bracket and the base plate is increased, and therefore the battery module assembly is stably fixed to the base plate.

Technical Solution

In order to accomplish the above object, a battery pack according to the present invention includes a battery module assembly including two or more battery modules, each of the battery modules having one or more battery cells arranged adjacent to each other in the state of being mounted in cartridges, a base plate having the battery module assembly loaded thereon, and a hold-down bracket fixing the battery module assembly to the base plate, wherein each of the cartridges includes a step portion having a lower part protruding outwards, the hold-down bracket includes an upper end portion covering upper surfaces of the step portions of the cartridges, a lower end portion coupled to the base plate, and a middle portion connecting the upper end portion and the lower end portion to each other, and a protrusion structure protruding in a direction toward the base plate is formed on the lower end portion of the hold-down bracket.

Only the protrusion structure of the lower end portion may be in contact with the base plate in a state before the battery module assembly is coupled to the base plate.

The maximum height of the protrusion structure may be greater than a value obtained by subtracting the height difference between the lower surface of the upper end portion of the hold-down bracket and the lower surface of the lower end portion of the hold-down bracket from the height of the step portion of each of the cartridges.

The protrusion structure may include at least one first protrusion formed on each of opposite ends of the lower end portion of the hold-down bracket and at least one second protrusion formed on the remaining region of the lower end portion of the hold-down bracket excluding the opposite ends.

In an embodiment, the protrusions may be formed on the outer circumferential part of the lower end portion. In another embodiment, the protrusions may be formed on a central part of the lower end portion.

A through-hole configured to fix the hold-down bracket to the base plate may be formed between each of the protrusions and an adjacent one of the protrusions.

A fastening member may be inserted into the through-hole so as to be coupled thereto.

The fastening member may be a bolt or a screw.

The hold-down bracket may be configured to couple a single battery module to the base plate. Alternatively, the hold-down bracket may be configured to couple a plurality of battery modules to the base plate.

At least a portion of the hold-down bracket may include an elastic material.

A recess may be formed in the step portion of each of the cartridges, and a depressed portion configured to be received in the recess may be formed in the hold-down bracket.

The present invention provides a device including the battery pack as a power source, and the device may be any one selected from the group consisting of an electric two-wheeled vehicle, an electric cart, an electric vehicle, a hybrid electric vehicle, a plug-in hybrid electric vehicle, and an energy storage apparatus.

The structure and manufacturing method of the device are well known in the art to which the present invention pertains, and thus a detailed description thereof will be omitted.

DESCRIPTION OF DRAWINGS

FIG. 1 is a perspective view of a battery pack according to an embodiment of the present invention.

FIG. 2 is a partial enlarged front view of FIG. 1.

FIG. 3 is a perspective view and a side view of a hold-down bracket according to an embodiment of the present invention.

FIG. 4 is a perspective view and a side view of a hold-down bracket according to another embodiment of the present invention.

FIG. 5 is a partial sectional view taken along line A-A' of FIG. 2, showing a state before coupling of the hold-down bracket.

FIG. 6 is a partial sectional view taken along line A-A' of FIG. 2, showing a state after coupling of the hold-down bracket.

FIG. 7 is a partial sectional view taken along line B-B' of FIG. 2.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, the details defined in the dependent claims of this specification are identically or similarly applicable to all embodiments described in this specification.

Hereinafter, embodiments of the present invention will be described in detail with reference to the accompanying drawings.

FIG. 1 is a perspective view of a battery pack according to an embodiment of the present invention.

Referring to FIG. 1, the battery pack according to the present invention includes a battery module assembly 100, a base plate 200, on which the battery module assembly 100 is loaded, and a hold-down bracket 300 configured to fix the battery module assembly 100 to the base plate 200.

The battery module assembly 100 includes a plurality of battery modules 110. Each of the battery modules 110 is configured to have a structure in which battery cells 10 are stacked in the state of being mounted in cartridges 20.

The battery cells 10 are coupled to each other while being connected to each other in series and/or in parallel so as to have desired capacity and output in the battery module 110, and are connected to each other in series and/or in parallel between individual battery modules 110 to constitute the battery module assembly 100.

The battery module assembly 100 may be mounted to a target device in the state of being coupled to the base plate 200. The hold-down bracket 300 may be used in order to stably couple the battery module assembly 100 to the base plate 200.

Each of the cartridges 20 includes a step portion 21, the lower part of which is coupled to the hold-down bracket 300. The lower part of the step portion protrudes outwards. The hold-down bracket 300 is mounted while wrapping the cartridge so as to cover the upper surface of the step portion 21.

Meanwhile, step portions may be formed at opposite sides of the lower part of the cartridge 20, and hold-down brackets may be mounted while wrapping the step portions at opposite sides of the lower part of the cartridge. Consequently, the battery module assembly may be stably fixed to the base plate.

FIG. 2 is a partial enlarged front view of FIG. 1, and FIG. 3 is a perspective view and a side view of a hold-down bracket according to an embodiment of the present invention.

Referring to FIGS. 2 and 3, the hold-down bracket 300 includes an upper end portion 310 configured to cover the upper surfaces of the step portions 21 of the cartridges 20, a lower end portion 330 coupled to the base plate, and a middle portion 320 configured to connect the upper end portion 310 and the lower end portion 330 to each other.

A protrusion structure 331 protruding in a direction toward the base plate is formed on the lower end portion 330.

The protrusion structure 331 may have a U-shaped or V-shaped vertical section, and the tip of the protrusion may be sharp or blunt.

A protrusion structure 331 is formed on each of the opposite ends of the lower end portion 330, and at least one protrusion structure is formed on the remaining region of the lower end portion excluding the opposite ends. FIGS. 2 and 3 show the state in which a protrusion structure 331 is formed on each of the opposite ends of the lower end portion 330 and two protrusion structures 331 are formed on the remaining region of the lower end portion, i.e. the inner region of the lower end portion, and therefore a total of four protrusion structures 331 is formed on the lower end portion.

In a state before the battery module assembly 100 is coupled to the base plate 200, only the protrusion structures 331 of the lower end portion 330 are in contact with the base plate 200, the remaining region of the lower end portion excluding the protrusion structures 331 is flat, and the surface of the remaining region of the lower end portion that is opposite the base plate 200 remains spaced apart from the base plate 200.

As shown in FIG. 3, the protrusion structures 331 may be formed on the outer circumferential part 335 of the lower end portion 330. Alternatively, it is a matter of course that the protrusion structures may be formed on a central part 336 of the lower end portion 330. A through-hole configured to fix the hold-down bracket 300 to the base plate 200 is formed between each of the protrusion structures 331 and an adjacent one of the protrusion structures 331.

A fastening member, such as a bolt or a screw, is inserted through the base plate via the through-hole 332 of the hold-down bracket so as to be coupled to a nut. At this time, fastening may be performed while the lower end portion, which is in a state of being floated by the protrusion structures 331, is further pushed toward the base plate, whereby the force of coupling between the bolt and the nut may be increased.

FIG. 2 shows the state in which a single battery module 110 is coupled to the base plate 200 via the hold-down bracket 300. However, it is a matter of course that the length of the hold-down bracket 300 may be increased in order to couple a plurality of battery modules to the base plate.

FIG. 4 is a perspective view and a side view of a hold-down bracket according to another embodiment of the present invention.

Referring to FIG. 4, the hold-down bracket 400 includes an upper end portion 410 configured to cover the upper surfaces of the step portions of the cartridges, a lower end portion 430 coupled to the base plate, and a middle portion 420 configured to connect the upper end portion 410 and the lower end portion 430 to each other.

A protrusion structure 431 protruding in a direction toward the base plate is formed on the lower end portion 430.

The protrusion structure 431 may have a U-shaped or V-shaped vertical section, and the tip of the protrusion may be sharp or blunt.

In the hold-down bracket 400 shown in FIG. 4, a protrusion structure 431 is formed on each of the opposite ends of the lower end portion 430 and two protrusion structures 431 are formed on the remaining region of the lower end portion, i.e. the inner region of the lower end portion, and therefore a total of four protrusion structures 431 is formed on the lower end portion, like the hold-down bracket 300 shown in FIG. 3.

The number and shape of the protrusion structures may be optionally applied and appropriately selected in consideration of the length of the hold-down bracket and the height of the step portion of each of the cartridges.

In the hold-down bracket 400 of FIG. 4, the protrusion structures are formed on a central part 436 of the lower end portion 430, unlike the hold-down bracket 300 of FIG. 3. The protrusion structures are located on the same line as through-holes 432.

In the case in which the protrusion structures are formed on the outer circumferential part 335 of the lower end portion, as shown in FIG. 3, the distance by which the upper end portion of the hold-down bracket pushes the step portions of the cartridges, in which the battery cells are mounted, is increased by the height of each of the protrusion structures even though tolerance occurs due to the height difference between the step portions of the cartridges, whereby it is possible to more strongly couple the hold-down bracket to the base plate. Consequently, the occurrence of tolerance due to the height difference between the step portions is reduced, whereby it is possible to prevent loosening of the cartridges, in which the battery cells are constrained.

On the other hand, in the case in which the protrusion structures are formed on the central part 436 of the lower end portion, as shown in FIG. 4, the protrusion structures are compressed at the time of bolt fastening, whereby the height of each of the protrusion structures is reduced. As a result, the fastening depth between the bolts and the nuts is increased, and therefore it is possible to improve the bolt loosening prevention effect.

Meanwhile, at least a portion of the hold-down bracket may include an elastic material. For example, a portion made of an elastic material may be included in the middle portion, the lower end portion, or the protrusion structures. In this case, the elastic material portion may be stretched or the elastic portions of the protrusion structures may be pressed at the time of fastening of the hold-down bracket, whereby the lower end portion may be further brought into tight contact with the base plate. Consequently, the state in which coupling between the bolts and the nuts is more strongly achieved may be maintained, whereby the effect of preventing loosening between the bolts and the nuts may be improved.

Referring to FIGS. 2 to 4, in a concrete example, recesses (not shown) may be formed in the step portions of the cartridges 20, and depressed portions 311 or 411 configured to be received in the recesses so as to be engaged therewith may be formed in the hold-down bracket 300 or 400. Consequently, the battery modules may be stably fixed to the base plate even when vibration is applied to the battery pack in an upward-downward direction and/or in a leftward-rightward direction.

FIG. 5 is a partial sectional view taken along line A-A' of FIG. 2, showing a state before coupling of the hold-down bracket, FIG. 6 is a partial sectional view taken along line A-A' of FIG. 2, showing a state after coupling of the hold-down bracket, and FIG. 7 is a partial sectional view taken along line B-B' of FIG. 2.

Line A-A' of FIG. 2 is located on the portion on which the protrusion structure is formed, and line B-B' of FIG. 2 is located on the portion in which the through-hole is formed.

Referring to FIGS. 5 to 7, in a state before coupling of the hold-down bracket 300, as shown in FIG. 5, the upper end portion of the hold-down bracket 300 is disposed so as to cover the upper surface of the step portion 21 of the cartridge, and only the protrusion structure 331, among the entire portion of the lower end portion 330, is in contact with the base plate 200.

At this time, the maximum height of the protrusion structure 331 is greater than the value obtained by subtracting the height difference a2 between the lower surface of the upper end portion 310 and the lower surface of the lower end portion 330 of the hold-down bracket from the height a1 of the step portion 21 of the cartridge.

In the case in which the maximum height of the protrusion structure is less than the value obtained by subtracting the height difference a2 between the lower surface of the upper end portion 310 and the lower surface of the lower end portion 330 of the hold-down bracket from the height a1 of the step portion 21 of the cartridge, it is difficult to achieve the object of more strongly coupling the battery module assembly to the base plate, which is undesirable.

In the state in which the hold-down bracket is coupled, as shown in FIG. 6, as the result of the bolt and the nut being fastened to each other through the through-hole, as shown in FIG. 7, the protrusion structure is pressed, whereby the remaining region of the lower end portion 330 excluding the protrusion structure is also brought into tight contact with the base plate. That is, the space in which the lower end portion 330 is further pushed to the base plate is formed by the protrusion structure, whereby fastening between the bolt and the nut is more deeply achieved. Consequently, it is possible to prevent loosening between the bolt and the nut.

In addition, a problem may occur in that height difference occurs between the cartridges or height difference or tolerance occurs between the battery modules, whereby the forces of coupling between the base plate and the battery cells in each of the battery modules or the forces of coupling between the base plate and the battery modules are partially different from each other. However, in the case in which the hold-down bracket having the protrusion structures formed thereon is used, as in the present invention, the hold-down bracket may be more strongly pressed against the base plate, whereby it is possible to prevent the occurrence of the problem described above.

Those skilled in the art to which the present invention pertains will appreciate that various applications and modifications are possible within the category of the present invention based on the above description.

DESCRIPTION OF REFERENCE SYMBOLS

10: Battery cell
20: Cartridge
21: Step portion
100: Battery module assembly
110: Battery module
200: Base plate
300, 400: Hold-down brackets
310, 410: Upper end portions
311, 411: Depressed portions
320, 420: Middle portions
330, 430: Lower end portions
331, 431: Protrusion structures
332, 432: Through-holes
335, 435: Outer circumferential part
336, 436: Central parts
a1: Height of step portion of cartridge
a2: Height difference between lower surface of upper end portion and lower surface of lower end portion

INDUSTRIAL APPLICABILITY

As is apparent from the above description, in a battery pack according to the present invention, the force of a hold-down bracket that presses a battery module assembly against a base plate may be further increased by protrusion structures formed on the hold-down bracket, whereby it is possible to increase the force of coupling between the battery module assembly and the base plate.

Also, in the case in which bolts and nuts are used in order to perform coupling between the battery module assembly and the base plate and an elastic material is applied to a portion of the hold-down bracket, it is possible to improve the effect of preventing loosening between the bolts and the nuts.

The invention claimed is:

1. A battery pack comprising:
a battery module assembly comprising two or more battery modules, each of the battery modules having one or more battery cells arranged adjacent to each other in a state of being mounted in cartridges;
a base plate having the battery module assembly loaded thereon; and
a hold-down bracket fixing the battery module assembly to the base plate,
wherein:
each of the cartridges comprises a step portion having a lower part protruding outwards,
the hold-down bracket comprises an upper end portion covering upper surfaces of the step portion of the cartridges, a lower end portion coupled to the base plate, and a middle portion connecting the upper end portion and the lower end portion to each other, and
a protrusion structure protruding in a direction toward the base plate is formed on the lower end portion of the hold-down bracket,
wherein the protrusion structure comprises a first protrusion formed on each of opposite ends of the lower end portion of the hold-down bracket and at least one second protrusion formed on a remaining region of the lower end portion of the hold-down bracket excluding the opposite ends, and
wherein a plurality of through-holes configured to fix the hold-down bracket to the base plate are formed in the lower end portion of the hold down bracket, and the at least one second protrusion is located between the plurality of through-holes and is aligned with the plurality of though-holes in a longitudinal direction of the lower end portion of the hold down bracket.

2. The battery pack according to claim 1, wherein only the protrusion structure of the lower end portion is in contact with the base plate in a state before the battery module assembly is coupled to the base plate.

3. The battery pack according to claim 2, wherein a maximum height of the protrusion structure is greater than a value obtained by subtracting a height difference between a lower surface of the upper end portion of the hold-down bracket and a lower surface of the lower end portion of the hold-down bracket from a height of the step portion of each of the cartridges.

4. The battery pack according to claim 1, wherein the first protrusion and the at least one second protrusion are formed on a central part of the lower end portion.

5. The battery pack according to claim 1, wherein a fastening member is inserted into a through-hole of the plurality of through-holes so as to be coupled thereto.

6. The battery pack according to claim 5, wherein the fastening member is a bolt or a screw.

7. The battery pack according to claim 1, wherein the hold-down bracket is configured to couple a single battery module to the base plate.

8. The battery pack according to claim 1, wherein the hold-down bracket is configured to couple a plurality of battery modules to the base plate.

9. The battery pack according to claim 1, wherein at least a portion of the hold-down bracket comprises an elastic material.

10. The battery pack according to claim 1, wherein a recess is formed in the step portion of each of the cartridges, and a depressed portion configured to be received in the recess is formed in the hold-down bracket.

11. A device comprising the battery pack according to claim 1 as a power source.

12. The device according to claim 11, wherein the device is any one selected from a group consisting of an electric two-wheeled vehicle, an electric cart, an electric vehicle, a hybrid electric vehicle, a plug-in hybrid electric vehicle, and an energy storage apparatus.

13. The battery pack according to claim 1, wherein the first protrusion and the at least one second protrusion are formed at an edge of the lower end portion.

* * * * *